May 3, 1955

T. WHEATLEY 2,707,613

VALVE ASSEMBLY

Filed Feb. 28, 1952

Thomas Wheatley
INVENTOR.

BY
Charles E. Lightfoot
ATTORNEY

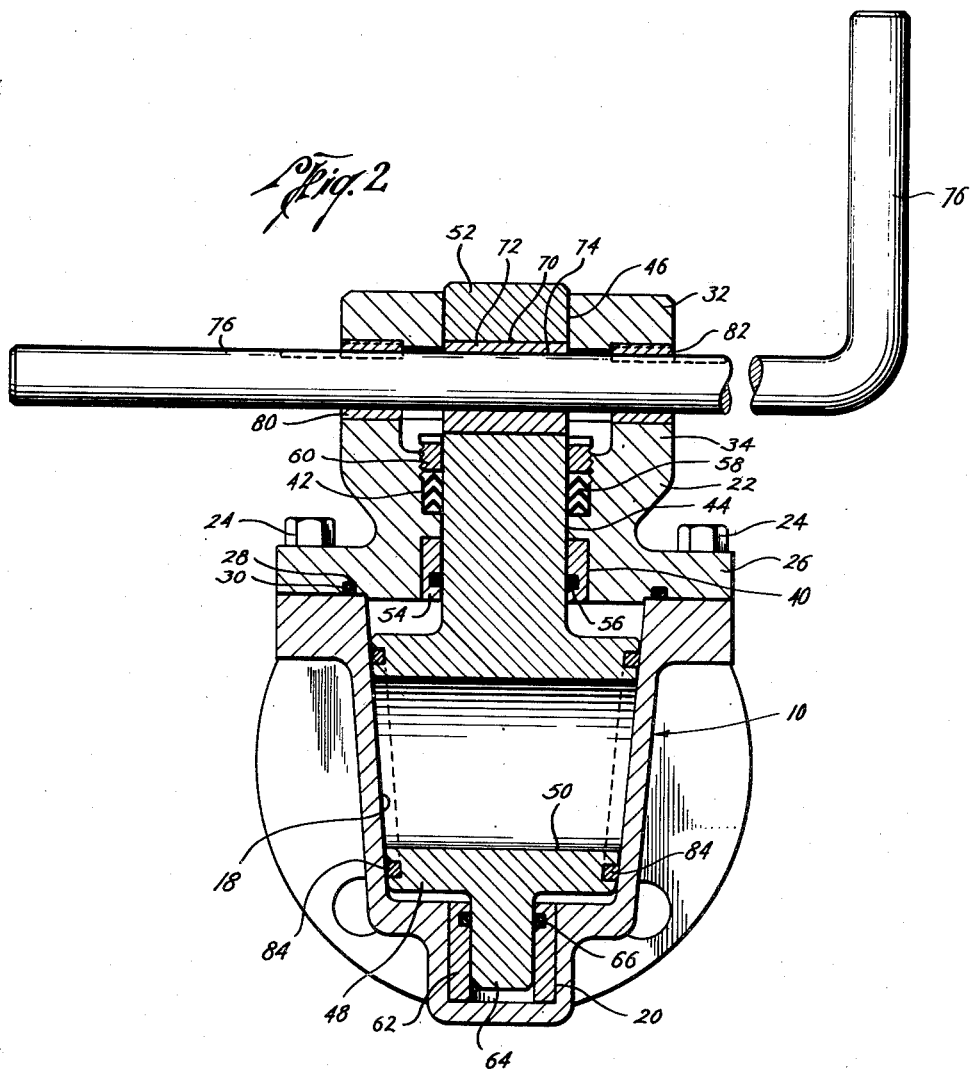

May 3, 1955 T. WHEATLEY 2,707,613
VALVE ASSEMBLY
Filed Feb. 28, 1952 3 Sheets-Sheet 3
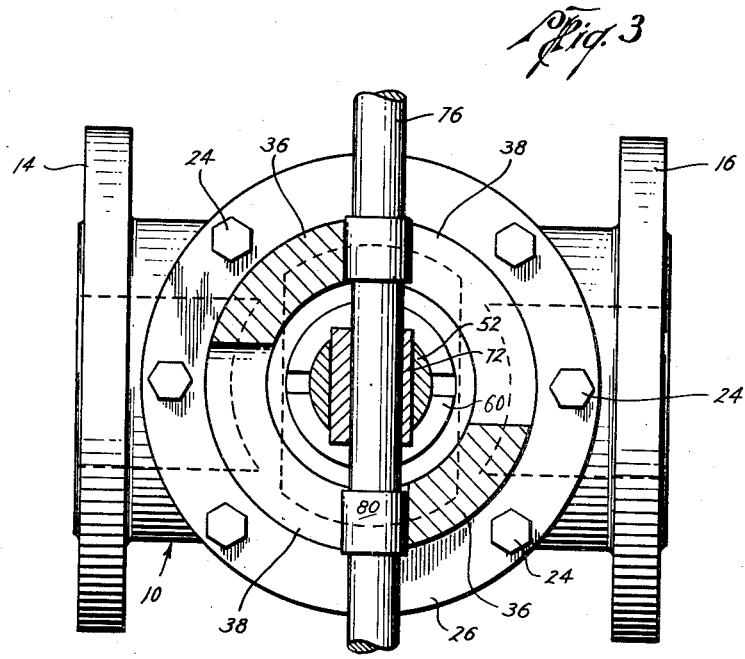
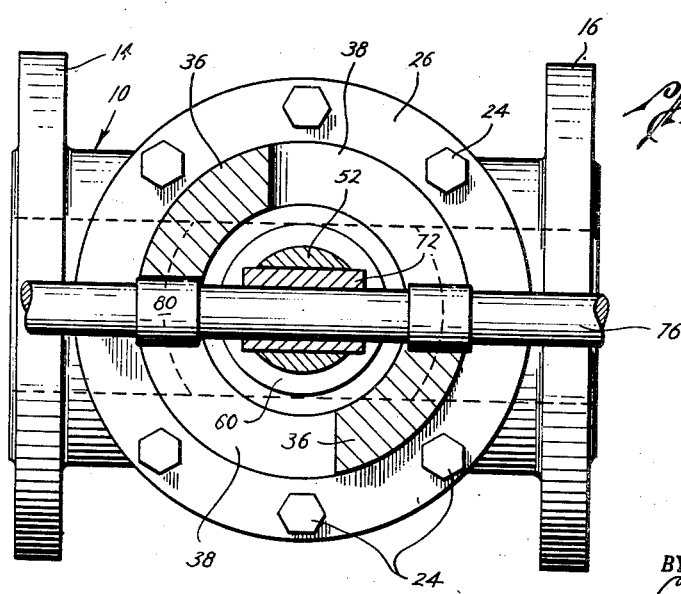
Thomas Wheatley
INVENTOR.
BY Charles E. Lightfoot
ATTORNEY

United States Patent Office 2,707,613
Patented May 3, 1955

2,707,613

VALVE ASSEMBLY

Thomas Wheatley, Houston, Tex., assignor to Tomco Supply Corporation, Houston, Tex., a corporation of Texas Application February 28, 1952, Serial No. 273,830

3 Claims. (Cl. 251—162)

This invention relates to a valve assembly, and more particularly to a rotatable plug valve and improved operating means for the same.

In valves of the rotatable plug type, as heretofore commonly constructed, the valve casing is provided with an internal bore in which a rotatable valve plug is seated, the plug being in sealing engagement with the seat and being opened and closed by rotation while in seated condition. Such valve structures present the serious disadvantage that rotation of the valve plug takes place in the seated condition of the plug, resulting in undue wear between the parts, so that frequent replacement becomes necessary. Moreover, in the event of the lodgment of foreign matter, such as sand, or the like, between the valve and its seat, the valve must be dismantled to remove the same, and in the event of the development of leakage between the valve and its seat, sealing engagement between the parts cannot readily be restored, so that replacement or reconditioning of the parts becomes necessary. The problem of excessive wear and leakage in valves of this type is especially aggravated when such valves are used in pipe lines to control the flow of material such as oil or other liquids containing abrasive substances, such as sand, mud, or the like, which may become lodged between the valve and its seat so that rotation of the valve causes a grinding action between the parts. The accumulation of deposits of such substances between the valve and its seat also sometimes results in causing the valve to stick, in which case it becomes necessary to dismantle the valve in order to restore the operation of the same.

The present invention has for its chief object the provision of a valve assembly of the plug type in which the above mentioned disadvantages are overcome, and in which means is provided for moving the valve toward and away from its seat, as well as rotating the valve to open and close the same.

Another object of the invention is to provide a valve assembly of the plug type in which the valve may be moved out of contact with its seat before rotating the valve to open or close the same, whereby rotation of the valve in contact with the seat may be prevented, thereby greatly prolonging the useful life of the valve.

A further object of the invention is the provision of a valve assembly of the type referred to, in which operating mechanism for the valve is provided by which the valve may be released from its seat in the event of sticking of the valve, and the valve may also be operated to dislodge foreign materials which may accumulate between the valve and the seat and to assure sealing contact between the parts.

Another object of the invention is the provision of improved operating mechanism in a valve structure of the type referred to, by which both rotation of the valve and movement of the valve toward and away from its seat may be accomplished.

The invention also contemplates the provision of an improved plug valve structure in which the valve is freely movable toward and away from its seat, and in which means is provided for preventing the development of fluid pressure between the valve and the valve casing which might interfere with such movement of the valve.

A still further object of the invention is to provide a valve assembly of the type referred to, which is of simple design and rugged construction, capable of long withstanding the extreme conditions of hard usage to which such a device is customarily subjected.

The above and other objects and advantages of the invention will best be seen from the following detailed description, constituting a specification of the same, when taken in conjunction with the annexed drawings, wherein—

Figure 2 is a vertical, central, cross-sectional view, taken in a direction at right angles to the view of Figure 1;

Figure 3 is a cross-sectional view, taken along the line of 3—3 of Figure 1, looking in the direction indicated by the arrows; and Figure 4 is a cross-sectional view, similar to that of Figure 3, showing the valve in its open condition.

Figure 1:
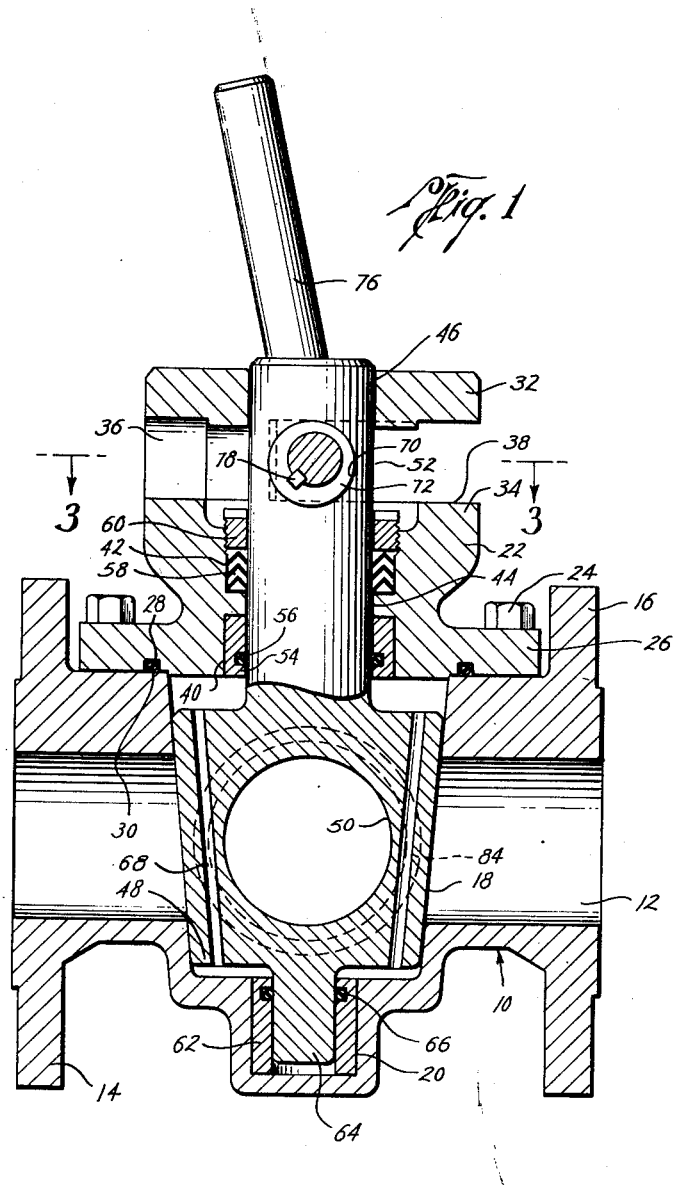
Figure 1 is a vertical, central, cross-sectional view of the invention, showing the valve in closed condition.

Referring now to the drawings in greater detail, the valve assembly of the invention has a valve casing, generally indicated at 10, provided with a longitudinal flow-way 12 therethrough, and having end flanges 14 and 16 for the connection of adjacent pipe sections to the casing.

The casing has a downwardly and inwardly tapering bore 18 therein, disposed generally at right angles to the flow-way 12 and extending across the same, the wall of the bore forming an internal valve seat for a rotatable plug valve. At the inner end of this bore there is a counterbore 20, of reduced diameter, for a purpose later to be made apparent.

A bonnet 22 is mounted on the valve casing, and secured thereto by suitable means, such as the bolt 24, extending through an outstanding annular flange 26 on the bonnet and threadably received in suitable internally threaded openings in the casing. The bonnet closes the outer end of the bore 18, and suitable sealing means is provided between the bonnet and the casing, such as an annular groove 28, formed in the lower face of the flange 26, in which packing means, such as an O-ring 30 is disposed, to form a fluidtight seal between the bonnet and the casing.

The bonnet is formed with upper and lower portions 32 and 34, respectively, the upper portion being spaced above the lower portion, and connected thereto by outstanding arcuate portions 36, forming horizontally disposed, oppositely arranged, arcuate slots 38 between the upper and lower portions.

The bonnet is also provided with a downwardly opening counter bore 40, opening into the bore 18 of the casing, and with an upwardly opening counter bore 42 in the lower portion 34 of the bonnet. The bonnet has a central vertical opening 44 between the counter bores 40 and 42, and the upper portion 32 of the bonnet also has a central opening 46 therethrough, which openings are provided to receive the stem of a plug valve positioned in the bore 18.

Within the bore 18 a plug valve 48 is rotatably positioned for sealing engagement with the interior of the bore. The plug valve has an opening 50 therethrough, which is adapted to be brought into registration with the flowway 12 in the open position of the valve, and which may be moved out of registration with the flow-way by rotation of the valve to close the same. The valve 48 is somewhat shorter than the depth of the bore 18, and when the valve is seated in the bore the inner end of the valve is spaced somewhat from the bottom of the bore, while the outer end of the valve is spaced inwardly of the outer end of the bore, so that the valve is capable of longitudinal movement relative to the bore into and out of seating engagement therewith.

The valve 48 has a valve stem 52 which extends through the bonnet through the openings 44 and 46 thereof. Within the recess 40 of the bonnet there is positioned a bushing 54, surrounding the stem 52, and suitable sealing means, such as an O-ring 56 may be carried by the bushing 54 to form a fluid tight seal between the bushing and the stem. Suitable packing, such as that indicated at 58, is disposed about the stem 52 in the counter-bore 42 of the bonnet, and may conveniently be retained therein by means of a screw plug 60, threadably received in the counter bore 42 and surrounding the stem 52. A bushing 62 is disposed in the counter bore 20 at the inner end of the bore 18, and the valve 48 has an extension 64 at its inner end, which is rotatably received in the bushing 62. Suitable packing means, such as an O-ring indicated at 66, may be carried by the bushing 62, surrounding the extension 64 in sealing engagement therewith.

The valve 48 is also provided with one or more pressure equalizing passageways 68, therethrough opening at the inner and outer ends of the valve into the bore 18, as best seen in Figure 1 of the drawings.

A lateral opening 70 extends through the stem 52 at the region of the space between the upper and lower portions 32 and 34 of the bonnet, and within this opening a bushing 72 is rotatably positioned, the bushing having an opening 74 therethrough, which is eccentrically located with relation to the opening 70 of the valve stem, as will be apparent from an inspection of the drawings. An operating member in the form of a handle 76 extends through the opening 74 of the bushing 72, and through the arcuate slots 38 of the bonnet, the bushing 72 being secured to the handle for rotation therewith, by means of a key 78, or other suitable means, as best seen in Figure 1 of the drawings. Suitable bearing means, such as those indicated at 80 and 82 are mounted on the handle 76 within the arcuate slots 38 and in bearing relation to the upper and lower portions 32 and 38 of the bonnet within the slot. These bearings 80 and 82 are arranged in concentric relationship to the handle 76, and support the handle on the bonnet for movement in the slot to rotate the valve stem. It will be noted that the slots 38 are of a length and so disposed as to permit a sufficient movement of the handle to rotate the valve approximately 90 degrees in order to move the valve from closed to open position, or vice versa. Also upon turning of the handle 76 on its axis, it will be seen that the bushing 72 rotates with the handle in the opening 70, and because of the eccentric arrangement of the bushing with relation to the handle the valve stem 52 will be raised or lowered upon such turning of the handle, whereby the valve may be moved into or out of seating contact with the bore 18.

In making use of the invention as described above, the handle 76 is first turned on its axis to lift the valve out of seating engagement with the bore 18, whereupon the valve is rotated by movement of the handle in the slot 38, to move the valve to open or closed position, and thereafter the handle 76 is again turned on its axis to move the valve into seating engagement with the bore. In this manner, rotation of the valve on the valve seat is effectively prevented. It will also be seen that upon longitudinal movement of the valve in the bore 18, fluid in the bore beyond the ends of the valve may readily flow through the pressure equalizing passageways 68, thus preventing such fluid from interfering with free movement of the valve toward or away from its seated position.

The valve 48 may conveniently be provided with inserts 84, surrounding the opening 50 therein, which inserts may be of hardened material, such as high carbon steel, for the purpose of reducing wear on the valve.

While the invention has been disclosed in connection with a specific embodiment of the same, it will be understood that this is intended by way of illustration only, and that numerous changes can be made in the construction and arrangement of the various parts without departing from the spirit of the invention, or the scope of the appended claims.

Having thus clearly shown and described the invention, what is claimed as new and desired to secure by Letters Patent is:

1. A valve assembly comprising, a valve casing having a flowway therethrough and a valve seat in the casing around the flowway, a valve in the casing and having a passageway therethrough, said valve being rotatable to move said passageway into and out of alignment with said flowway and also being movable into and out of seating engagement with said seat, a bonnet on the casing and having an opening in axial alignment with said seat and also having oppositely disposed laterally opening, arcuate slots in communication with said opening, a stem on the valve extending through said opening and having an opening therethrough in alignment with said slots, a bushing rotatably mounted in the opening in said stem and having an opening therethrough which is eccentrically disposed with relation to the opening in the stem, an operating member extending through said bushing and slots, bearing means carried by the member in said slots for rotation with the member in engagement with the bonnet to support the member on the bonnet, said bushing being mounted on said member for rotation with the member to move said valve into and out of seating engagement with said seat and said member being also movable in said slots to rotate said valve.

2. A valve assembly comprising, a valve casing having a flowway therethrough and a valve seat in the casing around the flowway, a valve in the casing and having a passageway therethrough, said valve being rotatable to move said passageway into and out of alignment with said flowway and also being movable into and out of seating engagement with said seat, a bonnet on the casing and having an opening in axial alignment with said seat and also having oppositely disposed laterally opening, arcuate slots in communication with said opening, a stem on the valve extending through said opening and having an opening therethrough in alignment with said slots, a bushing rotatably mounted in the opening in said stem and having an opening therethrough which is eccentrically disposed with relation to the opening in the stem, an operating member extending through said bushing and slots, bearings mounted on said member and slidable in said slots, said bearings being mounted on the member for rotation with said member and said bushing being mounted on the member to rotate with said member to move said valve into and out of seating engagement with said seat, said member being also movable in said slots to rotate said valve.

3. A valve assembly comprising, a valve casing having a flowway therethrough and an internal bore intersecting said flowway and forming a valve seat, a valve of shorter length than the depth of the bore in the bore and having a passageway therethrough, said valve being rotatable to move said passageway into and out of alignment with said flowway and also being movable longitudinally in the bore into and out of seating engagement with said seat, a bonnet on the casing and having an opening in axial alignment with said seat and also having oppositely disposed, laterally opening, arcuate slots in communication with said opening, a stem on the valve extending through said opening and having an opening therethrough in alignment with said slots, a bushing rotatably mounted in the opening in the stem and having an opening therethrough which is disposed eccentrically with relation to the opening in the stem, an operating member extending through said bushing and slots, bearings mounted on said member for rotation therewith and slidably engageable with the bonnet in the slots to support said member on the bonnet, said bushing being mounted on said member for rotation therewith to move said valve longitudinally in said bore, said member being also movable in said slots to rotate said valve, said valve having a passageway therethrough opening into said bore at each end of said valve.

References Cited in the file of this patent

UNITED STATES PATENTS

| | | |
|---|---|---|
| 1,848,369 | Mohr | Mar. 8, 1932 |
| 1,879,526 | Samms | Sept. 27, 1932 |
| 2,142,795 | McFarlane | Jan. 3, 1939 |
| 2,237,020 | Wilson | Apr. 1, 1941 |
| 2,441,705 | Jacobsen | May 18, 1948 |
| 2,544,090 | Jacobsen | Mar. 6, 1951 |